US012784335B2

(12) United States Patent
Joudrey et al.

(10) Patent No.: US 12,784,335 B2
(45) Date of Patent: Nov. 3, 2026

(54) RENDERING A SIMPLIFIED VERSION OF A DYNAMIC OBJECT USING SPRITES RECORDED AS TEXTURE DATA

(71) Applicant: VRChat Inc., San Francisco, CA (US)

(72) Inventors: Jesse Joudrey, Port Coquitlam (CA); Jordan Christopher Maddox, Lexington, KY (US)

(73) Assignee: VRCHAT INC., San Francisco, CA (US)

( * ) Notice: Subject to any disclaimer, the term of this patent is extended or adjusted under 35 U.S.C. 154(b) by 245 days.

(21) Appl. No.: 18/619,798

(22) Filed: Mar. 28, 2024

(65) Prior Publication Data

US 2025/0308148 A1 Oct. 2, 2025

(51) Int. Cl.
*G06T 15/80* (2011.01)
*G06T 15/04* (2011.01)

(52) U.S. Cl.
CPC .............. *G06T 15/80* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 2017/0200301 | A1* | 7/2017 | Boissé | G06T 17/05 |
| 2023/0274492 | A1* | 8/2023 | Chen | G06T 17/00 345/419 |
| 2023/0377268 | A1* | 11/2023 | Hopkins | G06T 17/205 |
| 2024/0013502 | A1* | 1/2024 | Baba | G06T 19/20 |
| 2024/0096041 | A1* | 3/2024 | Xu | G06T 17/00 |
| 2024/0282035 | A1* | 8/2024 | Minor | G06T 17/20 |
| 2024/0303951 | A1* | 9/2024 | Lombardi | G06T 15/06 |

* cited by examiner

*Primary Examiner* — Nurun Flora
(74) *Attorney, Agent, or Firm* — Polsinelli PC

(57) ABSTRACT

The present technology generates a simplified version of a dynamic object by capturing sprites from segments of the complex dynamic object while the complex dynamic object is rendered. When the complex dynamic object is requested in an environment in which it is not desirable to display the complex dynamic object, the sprite information can be used to provide a simplified version of the dynamic object. The simplified version of the dynamic object can have a similar visual appearance but can be easier to render. The spite information for the segments of the dynamic object can be recorded in texture data, and the sprite information can be looked up and selected in a GPU for rendering.

20 Claims, 12 Drawing Sheets

RENDERING A SIMPLIFIED VERSION OF A DYNAMIC OBJECT USING SPRITES RECORDED AS TEXTURE DATA

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be a shape of the shoulders and a head without any distinguishing features. Other avatars can include animated versions of a being. These avatars do not need to be in a humanoid form. Some avatars can be complex and can be associated with detailed graphics, and textures, and can be capable of various animations. As avatars become more elaborate, so too does the computing power to render the avatar.

BRIEF DESCRIPTION OF THE SEVERAL VIEWS OF THE DRAWINGS

Details of one or more embodiments of the subject matter described in this disclosure are set forth in the accompanying drawings and the description below. However, the accompanying drawings illustrate only some typical embodiments of this disclosure and are therefore not to be considered limiting of its scope. Other features, embodiments, and advantages will become apparent from the description, the drawings and the claims.

DETAILED DESCRIPTION

Figure 1:
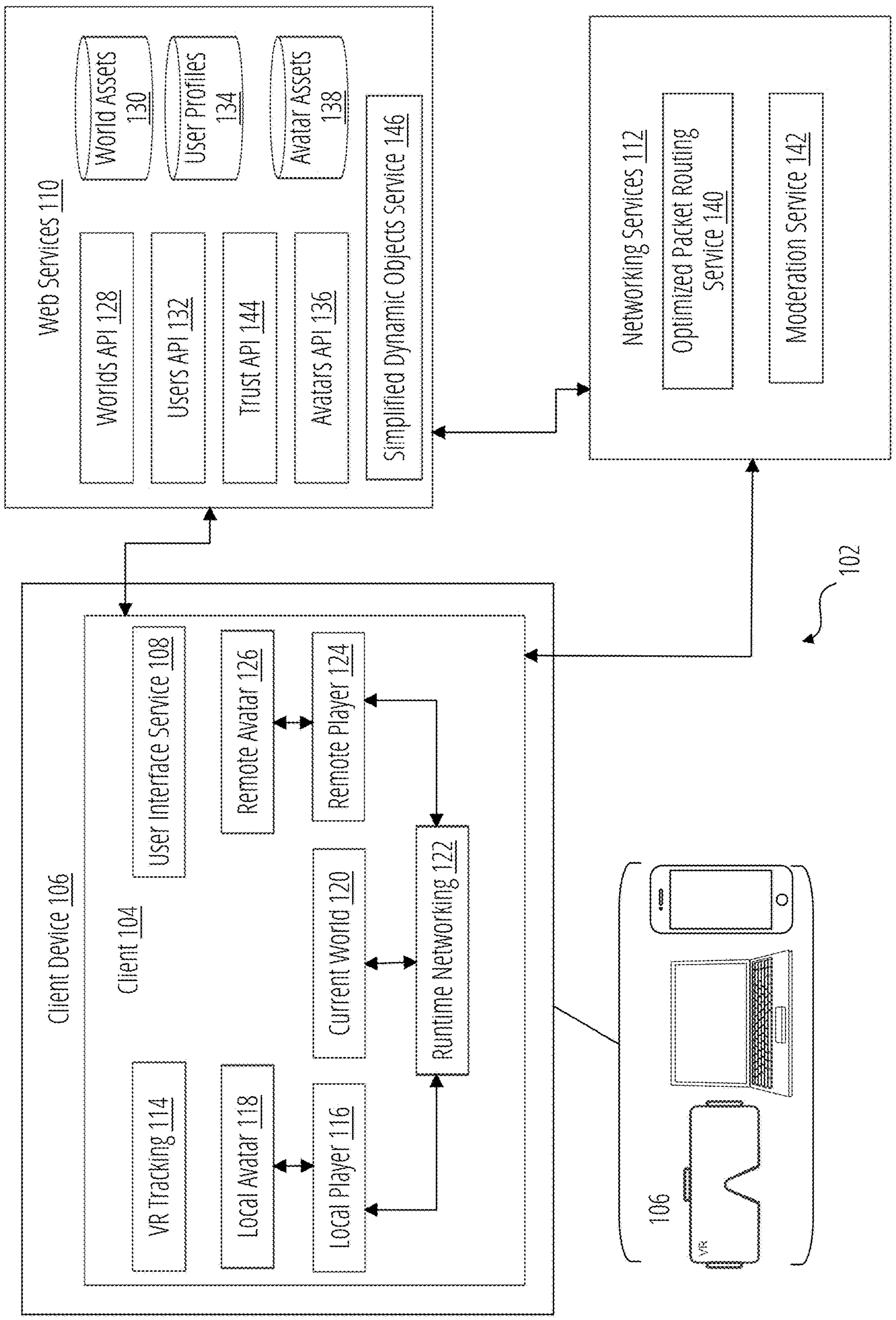
FIG. 1 illustrates an example virtual world platform for playing and hosting a multiplayer virtual reality (VR) experience in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A dynamic object is a virtual object that can be rendered in multiple poses in a virtual environment. The most prevalent example of a dynamic object in an avatar which might have individual segments, which segments can be rendered in different poses (an arm segment can be extended or flexed) and can be viewed from different angles (an extended arm can be pointed toward the ground or pointed towards another user). While avatars are the most prevalent example, other objects can be similarly dynamic such as non-character players, natural objects such as trees, etc. However, throughout this description avatars will often be referred to as an example of a dynamic object, and any reference to an avatar should be considered as a reference to a dynamic object that is applicable with only minor variation to other dynamic object types.

Some dynamic objects can be complex and associated with detailed graphics, textures, scripts, and they can be capable of various animations. As dynamic objects become more elaborate, so does the computing power required to render the dynamic object.

Generally, more complex dynamic objects are created with a specific environment in mind, and as such, the complex dynamic object can generally be rendered in the environment that is expected to support the complex dynamic object. For example, it has long been the norm that specialized gaming systems or computing systems with sufficient graphics hardware, such as a dedicated video card with graphics processing units and dedicated memory, graphics accelerators, etc., are used to render complex 3-D environments such as video games. However, it is increasingly the case that 3-D environments are often rendered on mobile devices. This is especially true in the context of virtual reality (VR) applications that are often rendered on VR headsets. Some of these VR headsets, like the OCULUS QUEST, have only as many graphics capabilities as a mobile phone. Dynamic objects created with the expectation that they will only be rendered on a computing system with sufficient graphics hardware can require more resources to render than might be available on other platforms.

Second, dynamic objects used to be application or platform-specific. For example, a dynamic object might be generated for use in a particular game or with a particular gaming system. However, as the metaverse becomes a commercial reality, the ability exists to take a dynamic object built for one environment into other environments, and some of these environments run on hardware that is not well suited to rendering complex dynamic objects.

The consequences of introducing a more complex dynamic object than the computing system can easily render can be degraded performance in rendering the environment. This consequence can be even greater in an environment where many dynamic objects can interact together. If several dynamic objects require too many computing resources, the environment will have unacceptable latency.

Another consequence could be that the complex dynamic object might not render at all. In such an instance, the computing environment might use a generic replacement avatar rather than anything that looks like the dynamic object. In the case of an avatar, this can create a problematic user experience. A person who has created a sophisticated avatar is likely an advanced user who would not like to be viewed as a user who is so new as not to have their own unique avatar. Further, just as a person's appearance can be used to identify the person in the real world, so too a user's avatar can be used to identify the person in a virtual world. It is not a good user experience for a game or platform to substitute a generic avatar in place of a user's unique avatar.

One concrete example of an environment in which complex dynamic objects result in negative consequences is a gaming platform accessible on many platforms that can range from powerful, personal computers to less capable VR headsets. The gaming platform is capable of allowing users to explore and socialize in 3-D worlds. The users are all represented by avatars. When a complex avatar is present in a world that includes a user accessing the world from one of the less capable VR headsets, the user on the VR headset might experience degraded performance or might not be able to render the complex avatar at all. Even users accessing the platform using powerful personal computers could experience degraded performance if too many complex avatars are present in the same world.

The present technology alleviates the above problems by selectively representing a simplified version of the complex avatar. The simplified version of the avatar can have a similar visual appearance but can be easier to render. While the appearance will be similar, it may lack some details, or it may lack some abilities governed by custom scripts associated with the avatar. However, the present technology permits the user with the complex avatar to continue to have approximately the same visual appearance while avoiding the degraded performance addressed above.

The present technology is not limited to avatars. Similar principles to those described herein can be adapted to generate and render a simplified version of any user-generated digital dynamic object.

The present technology is particularly well suited to environments with near real-time graphics such that dynamic objects need to be rendered and re-rendered for substantially every frame.

The present method and system generate a simplified version of a complex dynamic object by capturing sprites of segments of the complex dynamic object while it is rendered. When the complex dynamic object is requested in an environment in which it is not desirable to display it, the sprites and associated information can be used to provide a simplified version of the dynamic object.

In some embodiments, the present technology can be useful when the system that would benefit from a simplified version of a complex dynamic object does not have any control over the model of the complex dynamic object. Since the system does not have control over the model of the complex dynamic object, the system does not have any ability to change or improve properties associated with the complex dynamic object. Instead, the present technology applies to any dynamic object or user object that can be downloaded and rendered in a suitable computing environment.

The present technology also provides several technological efficiencies that result in a more efficient rendering of the simplified version of a dynamic object. As will be addressed further herein, the simplified version of the dynamic object is ultimately rendered from a collection of sprites taken from a variety of different angles while the segments of the complex dynamic object are manipulated into different poses. This means that to render the simplified version, the present technology must identify sprites that best match the pose and angle of the segments of the dynamic object at each frame and then the identified sprites are mapped to a mesh and rendered as the simplified version of the dynamic object. Central processing units (CPUs) are not optimized for tasks such as identifying sprites for the segments and rendering those sprites, so it would be desirable to perform such tasks in a graphical processing unit (GPU) when available. Accordingly, the present technology can map the sprites into texture data for the dynamic object in a way that the GPU can identify the sprites needed for the frames in which the dynamic object is to be rendered.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have embodiments of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a simplified dynamic objects service 146. As will be described herein, simplified dynamic objects service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
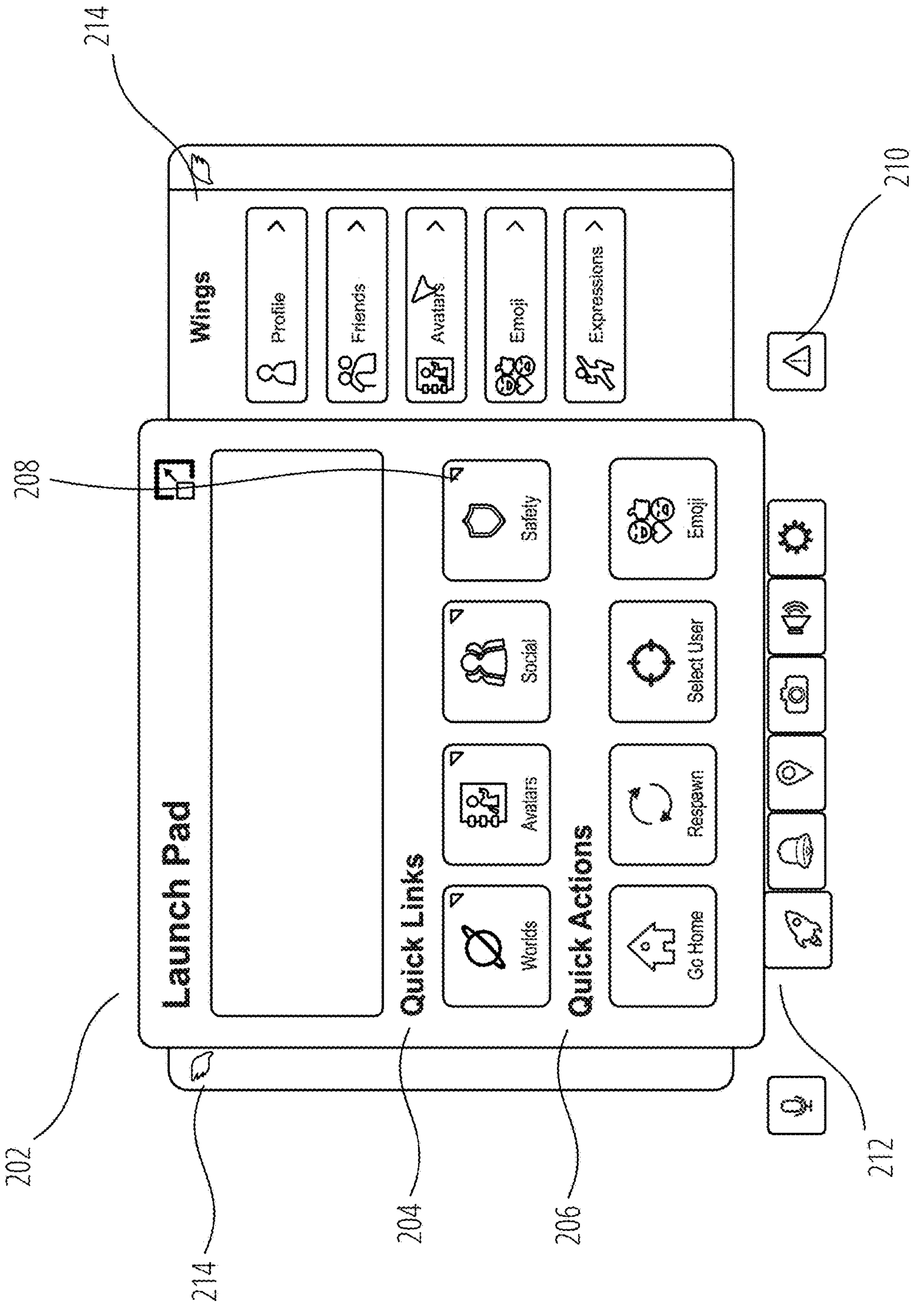
FIG. 2 illustrates an example quick menu in accordance with some embodiments of the present technology.

FIG. 2 illustrates an example quick menu 202 in accordance with some embodiments of the present technology. In particular, the quick menu 202 can be surfaced by the user interface service 108 on client 104 at any time or place in the virtual world platform 102.

The quick menu 202 includes a quick links 204 section that includes many commonly used menu options such as menus to browse worlds, avatars, friends, and a safety menu 208 to set safety settings for the user's profile.

The trust and safety menu 208 provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic or safe mode 210 to audio-and-visually mute anybody who is not a friend.

The quick menu 202 can also include a quick actions 206 section to provide frequently used actions in a convenient location. Some example quick actions include an action to go to your homeworld, to respawn in the last world you were in, to select another user's avatar (to communicate privately, to block the user from viewing or speaking to the local player 116, to copy the avatar or other function), and to select emojis.

The quick menu 202 also includes a dock 212, which also provides access to some common features like a virtual camera, volume settings, and a settings menu, among other features.

Figure 3:
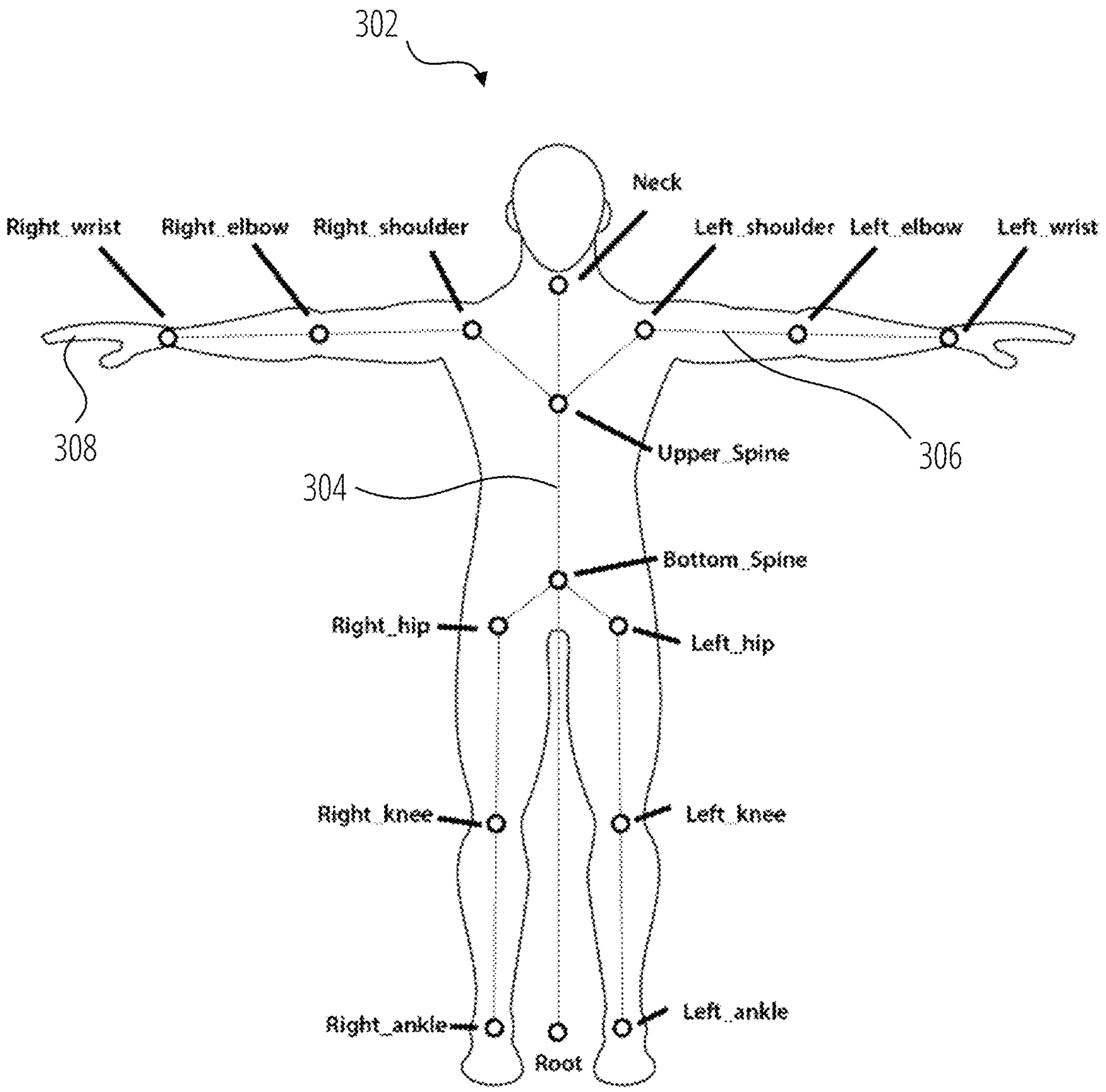
FIG. 3 illustrates an example dynamic object illustrated along with its skeleton in accordance with some embodiments of the present technology.

FIG. 3 illustrates an example dynamic object 302, a humanoid avatar, illustrated along with its skeleton 304. The skeleton 304 is comprised of a plurality of joints. Between each joint or between a joint and the terminal portions of the dynamic object are segments of the dynamic object. For example, the upper left arm between the shoulder and elbow is a segment 306, and the right hand between the wrist and the terminal portion (fingertips) is a segment 308. Just as with a human skeleton, the joints are areas of articulation which are used to move the body segments.

In addition to the skeleton 304, the dynamic object is made up of a 3-dimensional (3D) model that includes a mesh that gives the dynamic object a 3D shape and various artistic properties, including textures, shading, etc.

As illustrated in FIG. 3, the dynamic object 302 has a humanoid form arranged in a t-shaped pose. The t-shaped pose provides a large number of unobstructed views of segments of the avatar from many angles.

As introduced above, the present technology pertains to creating and rendering a simplified version of a complex dynamic object. In some embodiments, the complex dynamic object is made up of a high number of polygons, complicated mesh patterns, custom animations, metadata, scripts, shader properties, etc. All of these attributes make complex dynamic object difficult and slow to render. However, regardless of the specific properties of a complex dynamic object, as used herein, a "complex dynamic object" refers to an dynamic object that is/has been determined to be difficult to render in a particular environment in which the complex dynamic object has been requested.

Figure 4:
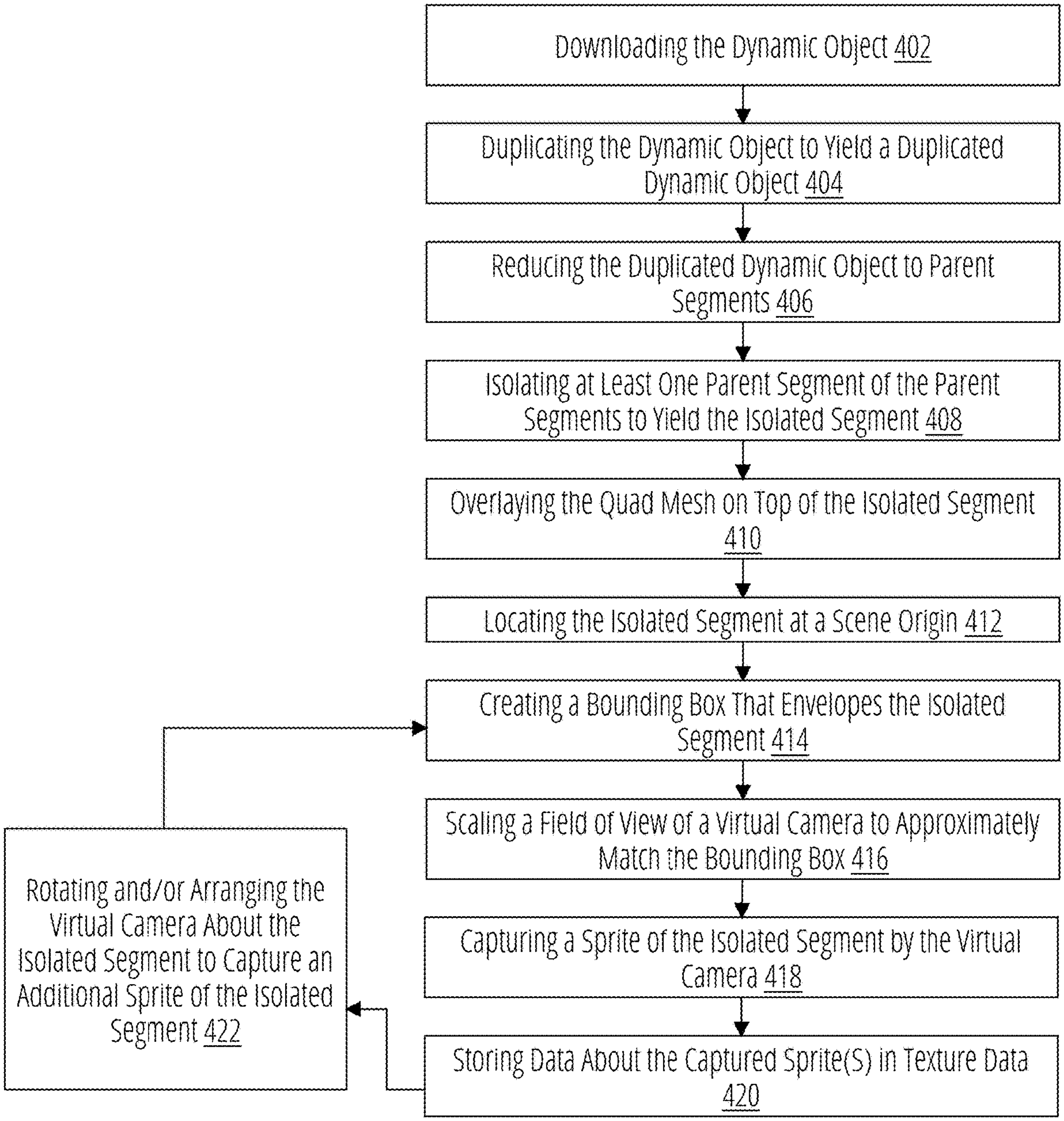
FIG. 4 illustrates an example method for creating a simplified version of a complex dynamic object in accordance with some embodiments of the present technology.

FIG. 4 illustrates an example method for creating a simplified version of a complex dynamic object in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes downloading the dynamic object at block 402. For example, the simplified dynamic objects service 146 illustrated in FIG. 1 may download the dynamic object. As addressed above, in some embodiments, the dynamic object is an avatar.

According to some examples, the method includes duplicating the dynamic object to yield a duplicated dynamic object at block 404. For example, the simplified dynamic objects service 146 illustrated in FIG. 1 may duplicate the dynamic object to yield a duplicated dynamic object. The dynamic object is duplicated so that portions of the dynamic object can be removed to be left with portions from which a simplified version of the dynamic object is to be created. At the same time, the original version of the dynamic object is retained, because it will be used later to capture the visual appearance of the original version of the dynamic object.

According to some embodiments, the method includes rendering the complex avatar. For example, the simplified dynamic objects service 146 can render the complex avatar. In some embodiments, the simplified dynamic objects service 146 can render the complex avatar in a process in a cloud datacenter such as the datacenter used by web services 110.

According to some examples, the method includes reducing the duplicated dynamic object to parent segments at block 406. For example, the simplified dynamic objects service 146 illustrated in FIG. 1 may reduce the duplicated dynamic object to parent segments. When the dynamic object is an avatar the parent segments are bones of a skeleton making up the avatar.

According to some examples, the method includes isolating at least one parent segment of the parent segments to yield the isolated segment at block 408. For example, the simplified dynamic objects service 146 illustrated in FIG. 1 may isolate at least one parent segment of the parent segments to yield the isolated segment. This process is addressed in greater detail with respect to FIG. 5.

According to some examples, the method includes overlaying the quad mesh on top of the rendered isolated segment of the complex version of the dynamic object at block 410. For example, the simplified dynamic objects service 146 illustrated in FIG. 1 may overlay the quad mesh on top of the isolated segment.

A quad mesh refers to a type of mesh in computer graphics that is composed predominantly of quadrilateral polygons, or quads, which are four-sided polygons. In the context of dynamic objects, a quad mesh provides a structured and versatile framework for defining the surface geometry of the dynamic object. This approach can result in improved deformation characteristics and a smoother, more natural appearance for the dynamic object when animated or manipulated in a virtual environment. In some embodiments, the quad mesh is also given a file name to be saved as an asset associated with the simplified version of the dynamic object.

According to some examples, the method includes locating the isolated segment at a scene origin at block 412. For example, the simplified dynamic objects service 146 illustrated in FIG. 1 may locate the isolated segment at a scene origin.

According to some examples, the method includes creating a bounding box that envelopes the isolated segment at block 414. For example, the simplified dynamic objects service 146 illustrated in FIG. 1 may create a bounding box that envelopes the isolated segment. The bounding box is created by using a convex mesh collider to identify the boundaries of the isolated segment and drawing the bounding box to include the boundaries of the isolated segment. The locating the isolated segment at the scene origin can make it easier to draw the bounding box by orienting the bounding box with respect to the scene origin. This can also make it easier to align the camera to the bounding box and later to make translations from the orientation in which the sprites were captured to the orientations in which the simplified version of the dynamic object is to be rendered (as addressed with respect to FIG. 8).

According to some examples, the method includes scaling a field of view of a virtual camera to approximately match the bounding box at block 416. For example, the simplified dynamic objects service 146 illustrated in FIG. 1 may scale the field of view of a virtual camera to approximately match the bounding box.

According to some examples, the method includes capturing a sprite of the isolated segment by the virtual camera at block 418. For example, the simplified dynamic objects service 146 illustrated in FIG. 1 may capture a sprite of the isolated segment by the virtual camera. The sprite is specific to a position and rotation of the virtual camera with respect to the isolated segment.

For each direction from which the sprites of the isolated segment were captured, a visual appearance and the shape of the segment of the rendered complex avatar are captured. In some embodiments, the images of the segments are associated with information about the location of the virtual camera with respect to the isolated segment.

In some embodiments, between 5-100 sprites per isolated segment are captured, but any number of sprites per isolated segment can be captured. In some embodiments, moving the virtual camera around the isolated segment (which remains at the scene origin) so as to capture the sprites of the isolated segment from different positions and rotations. In some embodiments, the sprites can be obtained by arranging the isolated segment in different rotations and orientations with respect to the virtual camera. Alternatively, the virtual camera could be located at the scene origin, and the isolated segment can move about the camera. Alternatively still, another method of obtaining the captured images from different orientations includes establishing a plurality of the virtual cameras at different positions about the isolated segment of the complex avatar to capture different orientations of the isolated segment.

The captured images are simple sprites and do not include a high number of polygons, complicated mesh patterns, custom animations, metadata, scripts, or shader properties.

In some embodiments, even though the captured images were taken of a 3-D object they do not provide depth information. In such embodiments, the capture of the sprites can also include sampling a depth buffer of points in 3-D space for locations of pixels making up each of the isolated segments of the complex dynamic object. The information captured from the depth buffer provides information about the 3-D shape of the complex avatar.

In some embodiments, the sampling of the depth buffer is from the same point of view as the virtual camera when capturing the images of the isolated segment of the complex dynamic object. In such embodiments, the samples from the depth buffer can be associated with the captured images taken from the virtual camera from the same direction.

Figure 7:
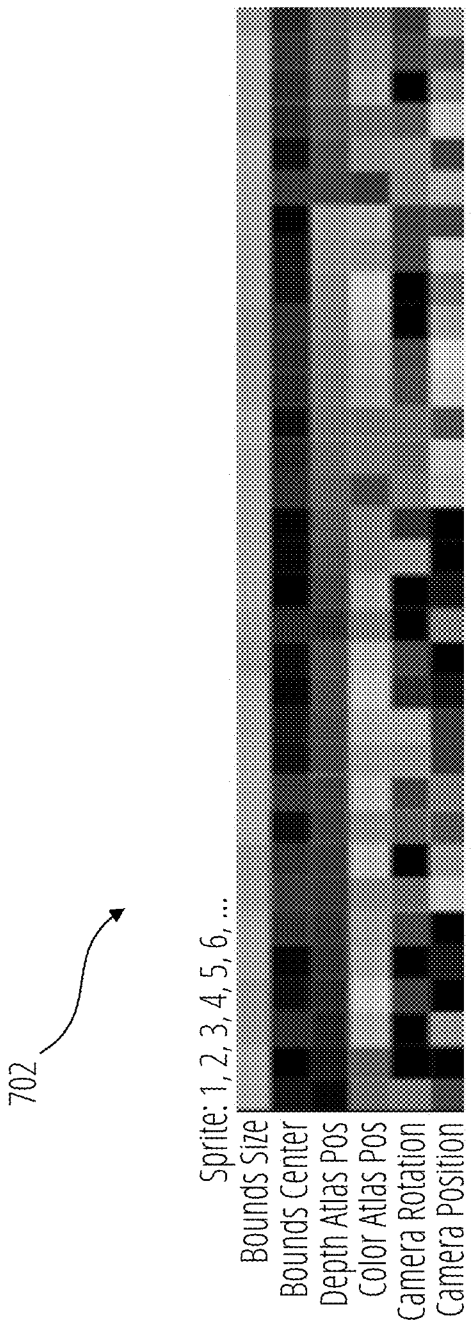
FIG. 7 illustrates an example of a strip texture, including texture data captured from sprites associated with poses and angles of isolated segments in accordance with some embodiments of the present technology.

According to some examples, the method includes storing data about the captured sprite(s) in texture data at block 420. For example, the simplified dynamic objects service 146 illustrated in FIG. 1 may store data about the captured sprite(s) in texture data. Each cell of the texture data is generally configured to store pixel information, so there are four channels of information (red, green, blue, alpha). The texture data is not generally used in this way, but the present technology writes data for each category into this 4-channel format to fit into a texture for the dynamic object. An illustration of the texture data is represented in FIG. 7.

The texture data can store a relative camera rotation in UV coordinates, a relative camera position in the UV coordinates, and bounding box information including a bounds size, a bounds center in the UV coordinates, a depth atlas position, and a color atlas position as texture data for the avatar, wherein data for the sprites is stored as the texture data for the dynamic object.

While data is captured for each sprite of an isolated segment, the dynamic object is made up of a plurality of segments. Data from the sprites for the plurality of segments are written into the same texture. To keep track of which sprites belong to which segment, an addressing scheme is used. More detail on the addressing scheme is addressed with respect to the rendering of the simplified version of the dynamic object with respect to FIG. 8.

As addressed above, the multiple views are captured of the isolated segment, which is reflected at block 422. According to some examples, the method includes rotating and/or locating the virtual camera about the isolated segment to capture an additional sprites of the isolated segment at block 422. For example, the simplified dynamic objects service 146 illustrated in FIG. 1 may rotate and/or locate the camera about the isolated segment to capture the additional sprites of the isolated segment.

The steps associated with blocks 414, 416, 418, 420, and 422 are repeated, as illustrated in FIG. 4, until a sufficient number of views have been captured. The sufficient number of views can represent the isolated segment from likely rotations and angles.

While not illustrated in FIG. 4, the method starting at block 408 can be repeated for multiple segments of the dynamic object such that the texture data will include information to render simplified versions of the segments of the dynamic object.

In some embodiments, generating the sprites for the simplified version of the dynamic object is performed in an offline or in a non-time sensitive process. In other words, the generating of the dynamic object is not performed at the time a simplified version of the dynamic object is requested. Rather the generating of the simplified version of the dynamic object can be performed when the dynamic object is first stored in avatar assets databases 138. Alternatively, a workflow to create the simplified version of the dynamic object can be queued once a client reports unsuitable performance in attempting to render the dynamic object. In some embodiments, a user can select their own avatar, or an avatar in a virtual world, and can request to have a simplified version of the avatar created.

Figure 5:
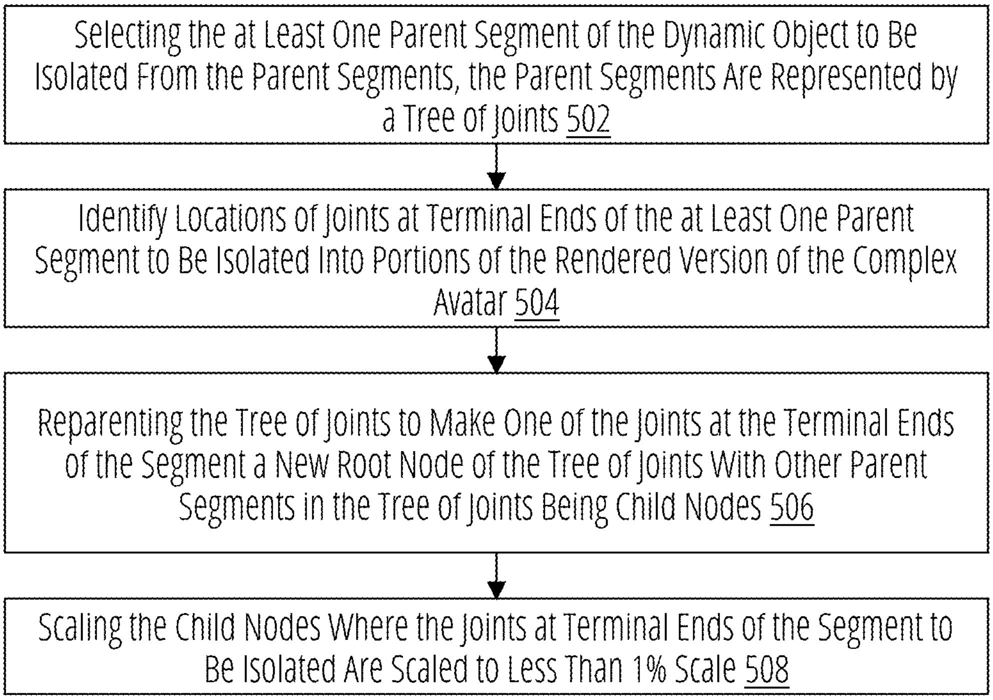
FIG. 5 illustrates an example method for isolating at least one parent segment of the parent segments to yield the isolated segment in accordance with some embodiments of the present technology.

FIG. 5 illustrates an example method for isolating at least one parent segment of the parent segments to yield the isolated segment in accordance with some embodiments of the present technology. In some embodiments, the method illustrated in FIG. 5 provides additional detail to block 408. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes selecting the at least one parent segment of the dynamic object to be isolated from the parent segments, the parent segments are represented by a tree of joints at block 502. For example, the simplified dynamic objects service 146 illustrated in FIG. 1 may select at least one parent segment of the dynamic object to be isolated from the parent segments.

Figure 6A:
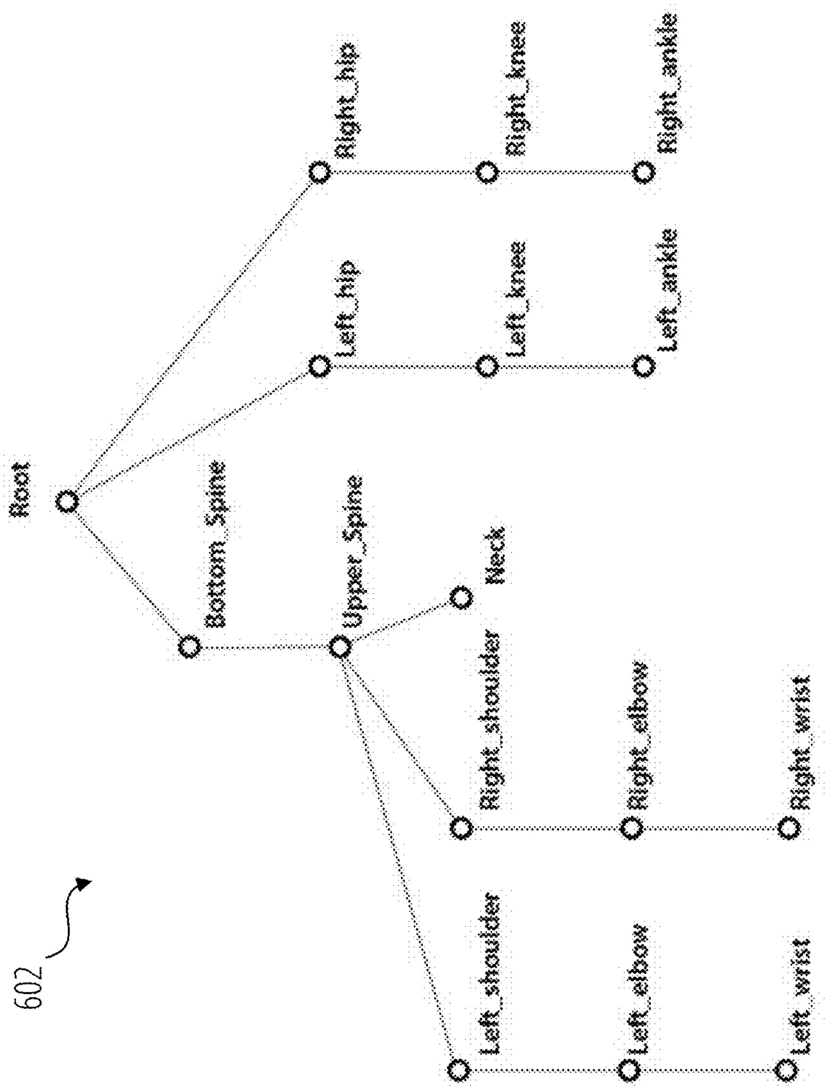
FIG. 6A and FIG. 6B illustrate reparenting of a tree of joints in accordance with some embodiments of the present technology.

In order to isolate the segments of the complex dynamic object, the simplified dynamic objects service 146 can select a segment of the complex dynamic object to be isolated from the plurality of segments represented by a tree of joints. (An example tree of joints for a humanoid skeleton of an avatar dynamic object, such as shown in FIG. 3 is illustrated in FIG. 6A.) A segment can be selected by identifying locations of joints at terminal ends of the segment to be isolated onto portions of the rendered version of the complex dynamic object. The simplified dynamic objects service 146 can be configured to methodically progress through the tree of joints one at a time.

According to some examples, the method includes identifying locations of joints at terminal ends of the at least one parent segment to be isolated into portions of the rendered version of the complex dynamic object at block 504. For example, the simplified dynamic objects service 146 illustrated in FIG. 1 may identify locations of joints at terminal ends of the at least one parent segment to be isolated.

Before the selected segment of the complex dynamic object can be isolated, simplified dynamic objects service 146 first reparents the tree of joints to make one of the joints at the terminal ends of the segment a new root node of the tree of joints. Typically, the joint that will become the new root node is at one of the terminal ends of the segment that already occupies the higher level in the tree of joints.

According to some examples, the method includes reparenting the tree of joints to make one of the joints at the terminal ends of the segment a new root node of the tree of joints with other parent segments in the tree of joints being child nodes at block 506. For example, the simplified dynamic objects service 146 illustrated in FIG. 1 may reparent the tree of joints to make one of the joints at the terminal ends of the segment a new root node of the tree of joints with other parent segments in the tree of joints being child nodes.

The reparenting of the tree of joints comprises iteratively reorganizing the tree of joints to promote the desired node in the tree of joints one level until the desired node is at the top of the tree of joints. The relative organization of the tree of joints remains the same, whereby each node in the tree of joints remains connected to the same neighbor in the tree of joints as the tree of joints is iteratively reorganized. It is only the level in the tree of joints that changes for the respective joints. If this process were animated, it might appear as if the terminal ends of the selected segment remain in place while the rest of the tree of joints rotates about the selected segment until one of the terminal ends of the selected segment is at the top of the tree of joints.

Figure 6B:
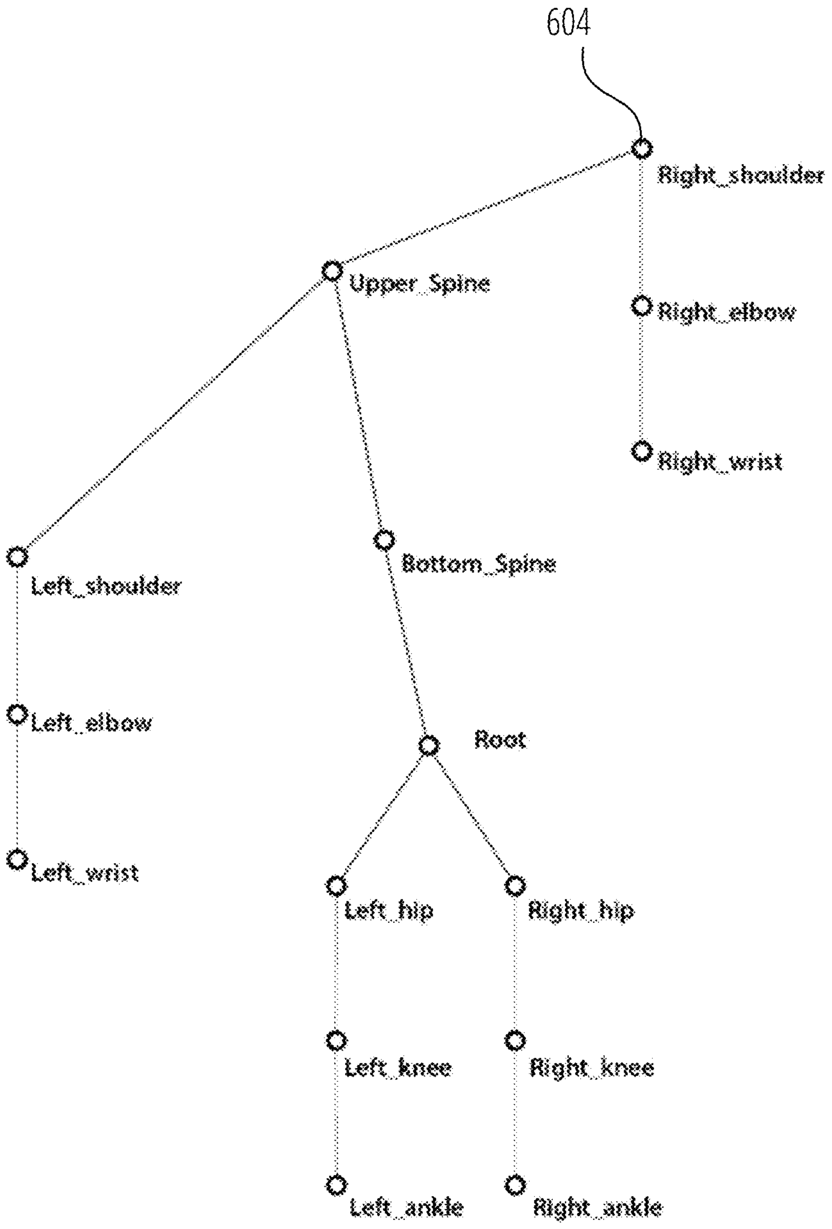
Figure 10C:
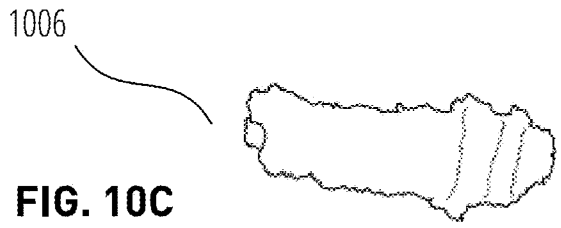
FIG. 10C illustrates the isolated segment as a captured image in accordance with some embodiments of the present technology.
Figure 10B:
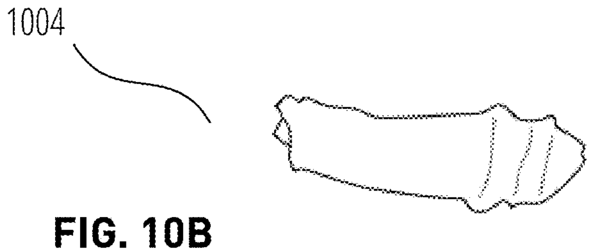
FIG. 10B illustrates an isolated segment in accordance with some embodiments of the present technology.
Figure 10A:
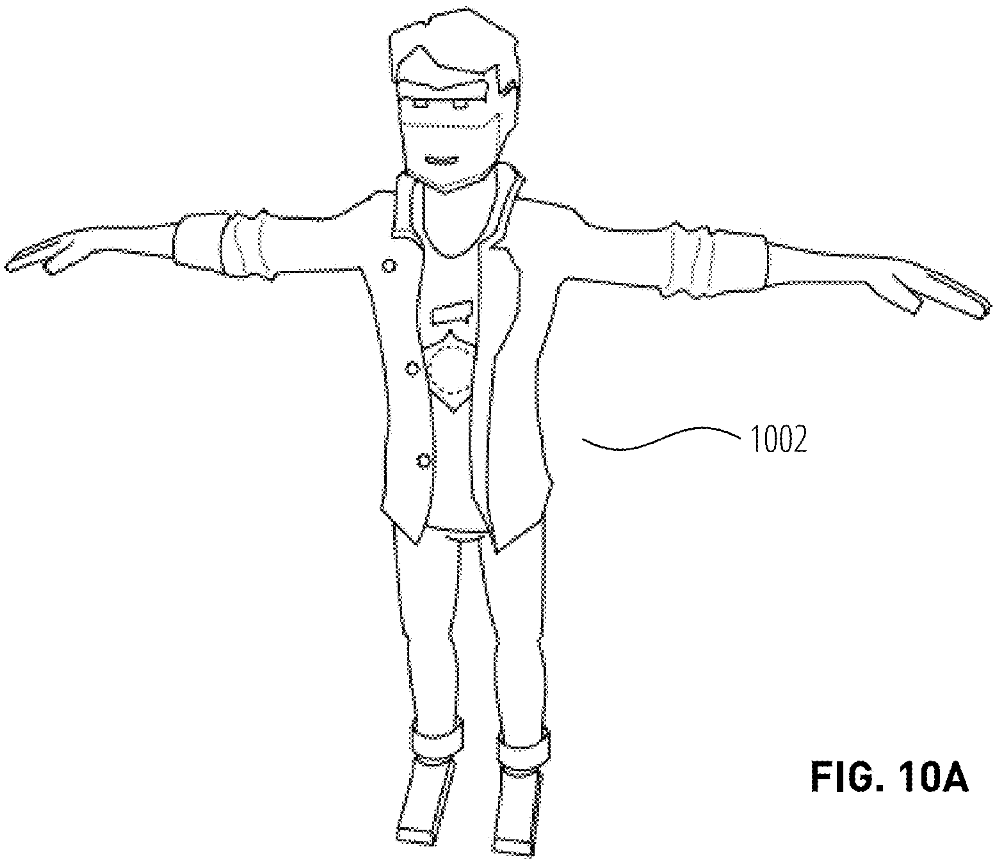
FIG. 10A illustrates the rendered version of the complex dynamic object in accordance with some embodiments of the present technology.

FIG. 6A, FIG. 6B illustrate the reparenting of the tree of joints 602 and FIG. 10A, FIG. 10B, and FIG. 10C, illustrate the isolation of the selected isolated segment. As addressed below, FIG. 6A and FIG. 6B illustrates reparenting the tree of joints so that the right shoulder has become the root node of the tree of joints, thereby allowing the right upper arm (between the right shoulder and the right elbow) to be the isolated segment.

According to some examples, the method includes scaling the child nodes where the joints at terminal ends of the segment to be isolated are scaled to less than 1% scale at block 508. For example, the simplified dynamic objects service 146 illustrated in FIG. 1 may scale the child nodes where the joints at terminal ends of the segment to be isolated are scaled to less than 1% scale. In some embodiments, the less than 1% scale is 1/10,000th to 1/100,000th scale. In some embodiments, the less than 1% is greater than zero to avoid potential errors from the rendering engine.

The scaling of the terminal ends (joints at either end) of the isolated segment results in a collapsing of portions of the rendered version of the complex avatar other than the isolated segment into the respective joints at the terminal ends of the isolated segment. This scaling results in a rendering where only the isolated segment of the complex avatar is visible. The rest of the complex avatar is still present, but since everything from the terminal end of the selected segment to be isolated to the bottom of the tree has been scaled to a very small scale, it is no longer visible. This is illustrated in FIG. 10B.

Scaling the terminal ends of the selected segment to be isolated has the advantage of rendering the isolated segment of the complex avatar as a closed volume. It may be possible to isolate the segment by other methods. For example, it might be possible to mask the rest of the complex avatar, crop the selected segment of the avatar, or cause the rest of the avatar not to be rendered. However, these techniques would likely cause the isolated segment to appear hollow when viewed from certain angles, and this would have the undesirable consequence of making the simplified version of the complex avatar look like a collection of disconnected parts when viewed from certain angles. However, it should be understood that the present technology does encompass these other techniques as the open volume consequence of these methods can be addressed by other known techniques in the art.

FIG. 6A and FIG. 6B illustrate the reparenting of the tree of joints 602. In FIG. 6A, the tree of joints 602 illustrates the root of the tree of joints as being between the lower back and the hips.

Each of those branches has branches coming off them that represent the attached limbs such as shoulders branching off the chest and lower legs branching off the upper legs. Branches that are near the root of the hierarchy are above or higher in the tree of joints than those that are further from the root.

The present technology can isolate each limb segment of the dynamic object (e.g., the upper arm from shoulder to elbow) using functionality provided by gaming engines, such as the gaming engine from UNITY SOFTWARE INC., which helps determine which locations represent the main joints of a humanoid dynamic object.

Also as addressed above with respect to block 916, part of isolating a segment of the humanoid dynamic object, involves reparenting the tree of joints. The present technology can reparent the tree of joints 602 for every segment to be isolated.

FIG. 6B illustrates an example of the reparenting of the tree of joints to move the joint for the right shoulder 604 to be the parent node, or highest node, or top node of the tree such that every other joint is subordinate to the right shoulder 604 in the tree of joints 602. It is an iterative process to arrive at the tree of joints 602 having the right shoulder 604 being the parent node. The present technology eventually results in a new hierarchy of every joint above the isolated segment. For example in FIG. 6B the right shoulder 604 is now the root of the hierarchy, and the joint that used to be above the isolated segment (such as the neck or chest) is moved to the previous position of the right shoulder 604.

FIG. 7 illustrates an example of a strip texture, including texture data captured from sprites associated with poses and angles of isolated segments in accordance with some embodiments of the present technology.

A "strip texture" refers to a specific type of texture asset that is often used for creating animated or dynamic visual effects within a game or application. A strip texture typically consists of multiple frames or images arranged horizontally or vertically in a sequence, forming a "strip" of images. The strip texture can be manipulated to achieve effects such as character animations, particle system animations, user interface transitions, or any other dynamic visual element requiring sequential image updates. By utilizing a strip texture, developers can efficiently incorporate animated content, enabling engaging and visually immersive user experiences.

In the context of the present technology the strip texture 702 is utilized differently than a strip texture might generally be used. Rather than including sequential images, the strip texture 702 includes a catalog of images (sprites) from which the appropriate sprite is selected and rendered using a fragment shader. Each cell of the texture data is generally configured to store pixel information, so there are four channels of information (red, green, blue, alpha).

Strip texture 702 includes a collection of sprites arranged by column. As illustrated in FIG. 7, columns contain data associated with individual sprites, as indicated by the numbered columns above the strip texture 702. Respective sprites in the plurality of sprites correspond to an isolated segment in a pose and an angle from which the sprite was captured. The whole dynamic object is atlased into the strip texture 702 so every sprite for representing the simplified version of the dynamic object is recorded in the strip texture 702.

The sprites are associated data stored in rows in the strip texture 702. For example, the rows include bounding box information, camera position information, and mesh deforming and coloring information.

The bounding box information includes a bounds size (the dimensions of the bounding box), a bounds center in the UV coordinates (the central point of the bounding box). The bounding box information can be used to map pixels of the sprite onto the quad mesh surrounding the segment to which the sprite corresponds.

UV coordinates, in the context of computer graphics and 3D rendering, are a two-dimensional texture mapping method used to wrap a 2D image or texture onto a 3D surface. The "UV" notation refers to the axes of the 2D texture space, where "U" represents the horizontal axis and "V" represents the vertical axis. Each vertex of a 3D model has a corresponding set of UV coordinates which specify how the 2D texture should be applied to the 3D surface. By defining UV coordinates for each vertex, the 3D model is effectively "unwrapped" onto a 2D plane, allowing the texture to be accurately and precisely mapped across the surface of the object, enabling realistic and detailed texture rendering. UV coordinates are commonly used in applications such as 3D modeling, animation, and game development to provide intricate and realistic surface detail to virtual objects, enhancing visual fidelity and contributing to immersive virtual environments.

The camera position information includes camera position and camera rotation data and is used to identify a point of view/a direction from which the virtual camera viewed the segment when it captured the sprite. The camera position information is also represented in UV coordinates. In the example illustrated in FIG. 7, the camera position information reflects a location in which a camera was moved around the isolated segment that was posed at the scene origin so that the camera could view the isolated segment from different angles and rotations.

The mesh deforming and coloring information includes pixel data pertaining to depth and color. The quad mesh needs to be deformed and colored to provide the correct texture and appearance. The mesh deforming information can be represented by values from zero to one (for each axis)

to indicate the amount of deformation from a starting point. The color information can be typical color values of red, green, blue, or alpha.

The strip texture 702 is referenced or indexed by an isolated segment and a camera position, represented in UV coordinates. As will be addressed in more detail with respect to FIG. 8 the strip texture 702 can be used to look up a sprite that is the best fit for a view of a segment to be rendered in each frame. The sprites for a specific segment (e.g., the left forearm ranging between the left elbow and left wrist) are arranged together in the strip texture 702. For example, if there are 36 sprites for the left forearm, they might be mapped to columns 36-72 of the strip texture. Thus, sprites for the left forearm begin at column 36. The GPU can search the strip texture 702 in columns 36-72 for a sprite that best matches a point of view (based on camera position and rotation) from which the left forearm is to be viewed.

The GPU can perform this look-up operation for each segment to be rendered and repeat this lookup for each frame.

Once the best sprite has been located in the strip texture 702, the GPU can orient and deform the mesh and use a fragment shader to perform the shading.

Figure 8:
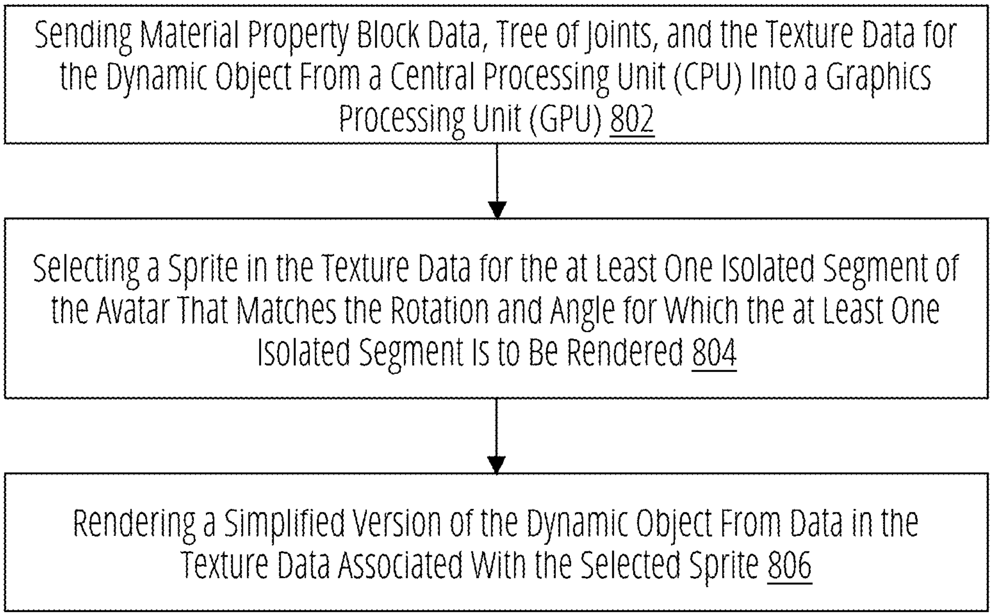
FIG. 8 illustrates an example method for rendering a simplified version of a dynamic object using sprites recorded as texture data in accordance with some embodiments of the present technology.

FIG. 8 illustrates an example method for rendering a simplified version of a dynamic object using sprites recorded as texture data in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

When client 104 receives a simplified version of a dynamic object to be rendered (as determined in FIG. 9), the client device can render the simplified version of the dynamic object in scenes in which the dynamic object is present.

FIG. 8 is addressed with respect to rendering at least one segment of the dynamic object; however, in most examples, all or most of the segments of the dynamic object will need to be rendered at the same time to render the dynamic object. For example, when the dynamic object is an avatar, it will frequently be the case that all of the segments (such as those represented in FIG. 6A and FIG. 6B) will need to be rendered together. However, in some instances, that avatar may be positioned to occlude one or more segments such that the occluded segments do not need to be rendered.

According to some examples, the method includes sending material property block data, the tree of joints, the saved mesh, and the texture data for the dynamic object from a central processing unit (CPU) into a graphics processing unit (GPU), at block 802. For example, the client 104 illustrated in FIG. 1 may send material property block data, the tree of joints, and the texture data for the dynamic object from the CPU into the GPU.

The present technology uses texture data because the GPU is limited in what data it can receive from the CPU. The texture is readable by GPU, and other limited information in the material property blocks, which can include an index for where a segment starts in the texture and the amount of sprites that segment has.

In the UNITY game development platform, a "material property block" is a data structure that allows developers to efficiently set and modify the properties of multiple materials at runtime without having to create duplicate materials. This block contains properties such as color, texture, and custom data that can be applied to renderers within a scene, providing a flexible and performance-conscious method for dynamically altering the visual attributes of rendered objects. By utilizing material property blocks, developers can implement efficient and customizable rendering effects, such as per-object customization and shader modifications, while minimizing computational overhead and memory usage.

The material property block data includes a sprite count, which is a number of sprites stored in the texture data, and a data chunk start which identifies a position in the texture data in which sprites for a segment begin. The material property block data further includes a segment current rotation matrix, which is provided to the GPU every frame. Using material property blocks in this way permits static batching, meaning that each simplified version of the dynamic object can render in only one draw call, despite having multiple instances of the texture data for the quad mesh.

While the sprite count for each segment, and the starting position for sprites of each segment only need to be sent to the GPU once, the segment current rotation matrix for the segment needs to be sent to the GPU for each frame. As the dynamic object moves around, the segments rotate, and the segment current rotation matrix defines the rotation of the segment for that frame. The rotation of the segment can be translated such that it corresponds to a camera position and rotation that corresponds to the positions and rotations as they are expressed in the strip texture 702.

According to some examples, the method includes selecting a sprite in the texture data for the at least one isolated segment of the avatar that matches the rotation and angle for which the at least one segment is to be rendered at block 804. For example, client 104, illustrated in FIG. 1, may select a sprite in the texture data for at least one segment of the avatar that matches the rotation and angle for which at least one segment is to be rendered. More specifically, for each segment to be rendered, the GPU searches the strip texture 702 for a sprite that is the best fit for a view of a segment to be rendered in each frame. The sprites for a specific segment (e.g., the left forearm ranging between the left elbow and left wrist) are arranged together in the strip texture 702. For example, if there are 36 sprites for the left forearm, they might be mapped to columns 36-72 of the strip texture. Thus, sprites for the left forearm begin at column 36. The GPU can search the strip texture 702 in columns 36-72 for a sprite that best matches a point of view (based on camera position and rotation) from which the left forearm is to be viewed. The best point of view is the camera angle, which has the smallest deviation from the angle in which the segment of the dynamic object is to be viewed.

The GPU can perform this look-up operation for each segment to be rendered and repeat this lookup for each frame.

According to some examples, the method includes rendering a simplified version of the dynamic object from data in the texture data associated with the selected sprites at block 806. For example, client 104, illustrated in FIG. 1, may render a simplified version of the dynamic object from data in the texture data associated with the selected sprites.

The rendering a simplified version of the dynamic object from the texture data further comprises mapping the selected sprite to the quad mesh using the offsets of the vertices of the quad mesh overlaid the segments of the dynamic object based on the bounds data for that camera rotation and angle, and deforming the quad mesh based on the texture data for the selected sprite.

The calculating the location of any selected sprite includes using the bounds data (bounds size and bounds center) to translate the values in the texture to get depth and to align the center spot and rotation of the sprite to the quad mesh. In order to calculate the correct vertex position, the rotations of the mesh that occurred during capture also need to be undone to translate from a local rotation (at scene origin) to a world space rotation. This data is passed to the fragment shader handle the shading of the quad mesh.

Once the sprite is oriented onto the quad of the segment of the dynamic object, the depth atlas position data and the color atlas position data can be used to deform and color the mesh to provide texture and appearance. The mesh deforming information can be represented by values from zero to one (for each axis) to indicate the amount of deformation from a starting point. The color information can be typical color values of red, green, blue, or alpha.

In some embodiments, the amount of deformation of the quad mesh for a pixel of a segment can vary widely depending on the segment and the rotation of the segment. To account for this, the 0-1 values represented in the strip texture 702 can be scaled using additional data included in the material property block data. For example, a value of 0.3 might represent less of a distortion to the quad mesh when over a forearm than if over the chest of a burly character.

The rendering a simplified version of the dynamic object from the texture data further comprises shading the quad mesh using a fragment shader using the texture data for the selected sprite to yield the rendered imposter. The correct vertex position data can be used to identify UV positions on the quad mesh to be shaded as indicated in the texture data for the selected sprite. The shading can be performed using a standard lighting model by the fragment shader.

Figure 9:
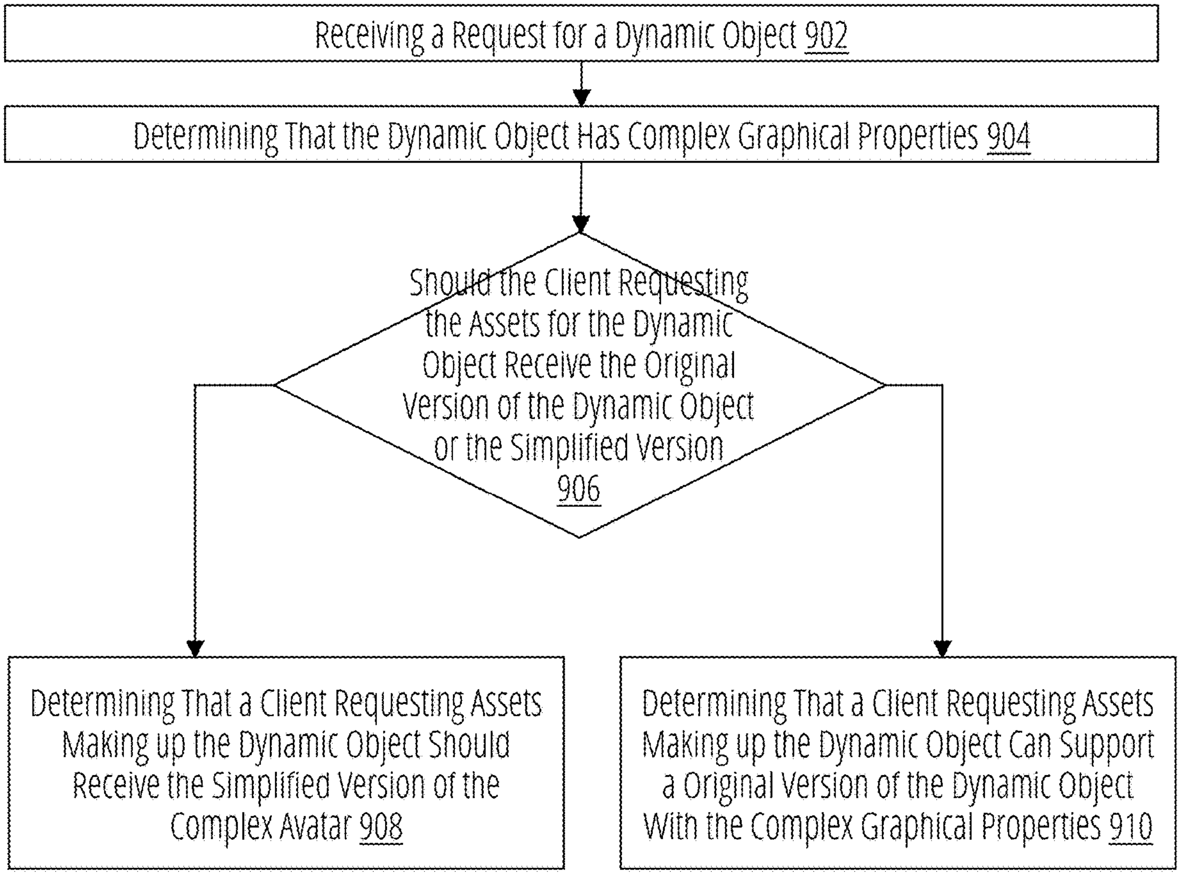
FIG. 9 illustrates an example method for determining whether a client should receive an original version of a dynamic object or a simplified version in accordance with some embodiments of the present technology.

FIG. 9 illustrates an example method for determining whether a client should receive an original version of a dynamic object or a simplified version in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As introduced above, some clients might be capable of rendering a complex version of a dynamic object, but some clients might not. Accordingly, the present technology causes the avatars API 136 to determine which version of the dynamic object to serve. In the example described with respect to FIG. 9, the client is requesting an avatar, but the client could be requesting another type of dynamic object thought an alternate API or from world assets database 130.

According to some examples, the method includes receiving a request for a dynamic object at block 902. For example, the avatars API 136 illustrated in FIG. 1 may receive a request for a dynamic object.

According to some examples, the method includes determining that the dynamic object has complex graphical properties at block 904. For example, the avatars API 136 illustrated in FIG. 1 may determine that the dynamic object has complex graphical properties. The complex graphical properties can include a high number of polygons to result in a high-resolution dynamic object, or the complex graphical properties can include complex shadings, or scripts or animations.

According to some examples, the method includes determining that the client requesting the assets for the dynamic object should receive the original version of the dynamic object or the simplified version at decision block 906.

According to some examples, the method includes determining that a client requesting assets making up the dynamic object should receive the simplified version of the complex avatar at block 908. The client should receive the simplified version because the client does not have a sufficiently capable graphics processing unit (GPU), sufficient memory, or sufficient display resolution. The client should receive the simplified version because the client is associated with a user with settings the disable complex dynamic objects. The user might consider such complex dynamic objects as possible vectors for malware. The user might want to be protected from content that can associated with scripts and animations associated with the dynamic object.

According to some examples, the method includes determining that a client requesting assets making up the dynamic object can support an original version of the dynamic object with the complex graphical properties at block 910.

FIG. 10A, FIG. 10B, and FIG. 10C illustrate the general steps addressed above regarding isolating segments of the dynamic object in block 408, and capturing sprites of the dynamic object in block 418.

FIG. 10A illustrates a rendered version of the complex avatar 1002. Although it is difficult to illustrate in line drawing form, the rendered version of the complex avatar 1002 can be highly detailed and can have a complex 3-D shape or require a lot of triangles to be drawn to render properly. The complexity or detail can cause the avatar to be difficult to render in some environments.

FIG. 10B illustrates an isolated segment. In this example, the isolated segment is the right upper arm. FIG. 10B illustrates the same version of the upper right arm as rendered in FIG. 10A, except that the rest of the complex avatar is not visible. In some embodiments, the rest of the complex avatar has been scaled to such a small size that it is not visible.

FIG. 10C illustrates the isolated segment as a captured image 1006. Although difficult to illustrate in line drawing form, the captured image is of a smaller file size and easier to render. In some embodiments, the captured image may be of somewhat lower quality or resolution that the complex version of the isolated segment, and might not include any associated scripts or animations. The isolated segment as the captured image along with the depth buffer data can be used to build a copy of the isolated segment as viewed from the direction of the camera used to capture it.

In the present technology, instead of drawing the original character model, the present technology selects the best fitting pre-generated image and shape for each limb segment, which is the one that was captured using a camera that was facing the same way as the current view camera, or the closest one to that direction, and draw it instead. This reduces the size of the character assets such that more of them can be loaded into memory on a given device and it reduces the geometric complexity of the character such that it takes less resources to render it to the screen. The size of the output using the current technology does not grow with the size of the data of the input complex avatar. A normally proportioned humanoid simplified version of an avatar can export to a file that is about 3-4 MB even if the original complex avatar was 100 MB or more.

Figure 11:
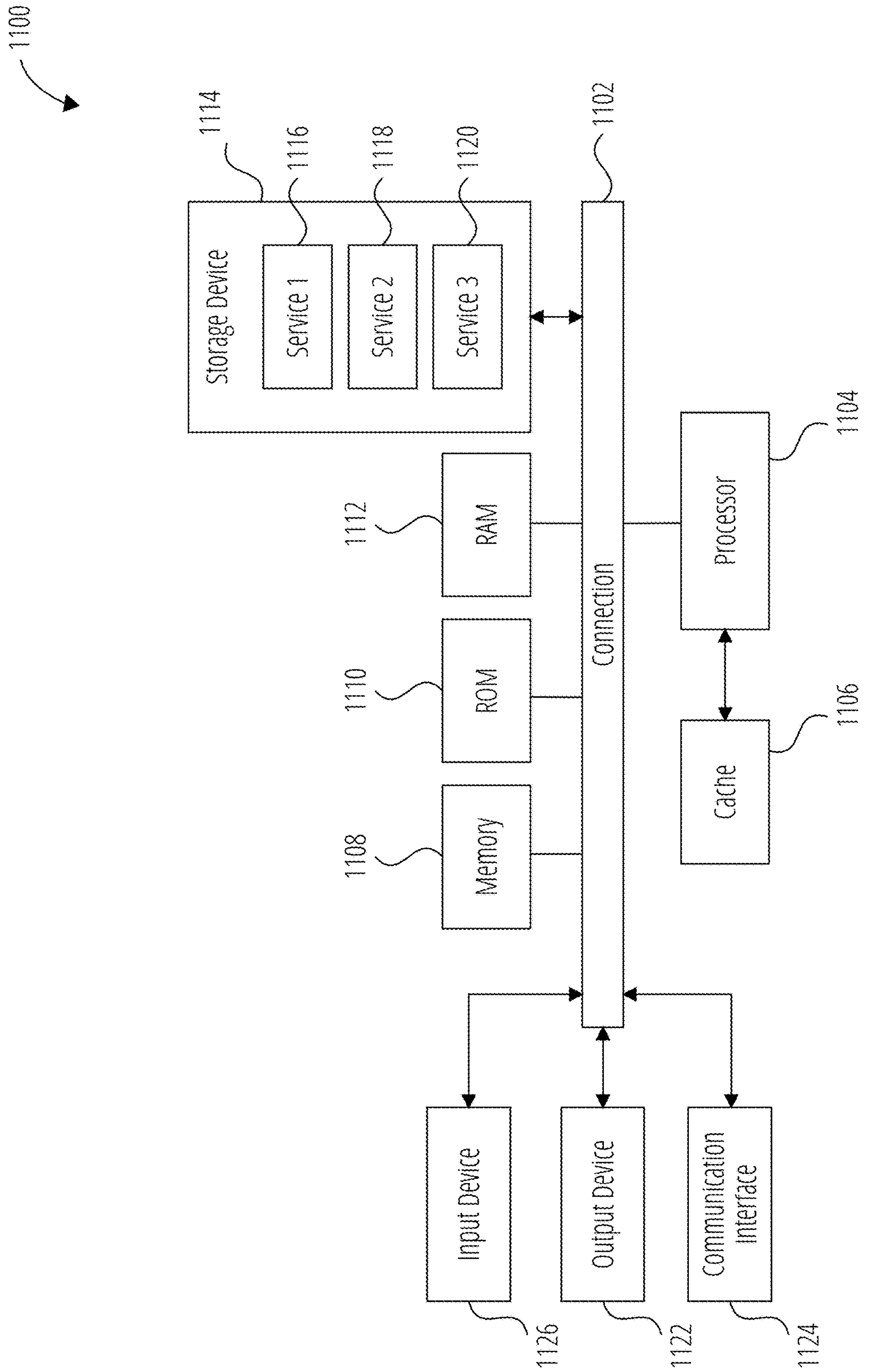
FIG. 11 shows an example of a system for implementing certain embodiments of the present technology.

FIG. 11 shows an example of computing system 1100, which can be for example any computing device making up client device 106, or web services 110, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1104 and connection 1102 that couples various system components including system memory 1108, such as read-only memory (ROM) 1110 and random access memory (RAM) 1112 to processor 1104. Computing system 1100 can include a cache of high-speed memory 1106 connected directly with, in close proximity to, or integrated as part of processor 1104.

Processor 1104 can include any general purpose processor and a hardware service or software service, such as services 1116, 1118, and 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain embodiments within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspects

The present technology includes computer-readable storage mediums for storing instructions, and systems for executing any one of the methods embodied in the instructions addressed in the aspects of the present technology presented below:

Aspect 1: In one aspect, a method for capturing and rendering an imposter of a dynamic object, the method includes capturing an imposter of a dynamic object by downloading the dynamic object, where the dynamic object is an avatar; duplicating the dynamic object to yield a duplicated dynamic object; reducing the duplicated dynamic object to parent segments, where when the dynamic object is the avatar the parent segments are bones of a skeleton making up the avatar; isolating at least one parent segment of the parent segments to yield an isolated segment. The method also includes capturing an imposter of a dynamic object by overlaying a quad mesh on top of the isolated segment, and naming the quad mesh. The method also includes capturing an imposter of a dynamic object by locating the isolated segment at a scene origin. The method also includes capturing an imposter of a dynamic object by creating a bounding box that envelopes the isolated segment, the bounding box is created by using a convex mesh collider to identify the boundaries of the isolated segment and drawing the bounding box to include the boundaries of the isolated segment; scaling a field of view of a virtual camera to approximately match the bounding box; capturing a sprite of the isolated segment by the virtual camera, where the sprite is specific to a location and angle of rotation of the virtual camera with respect to the isolated segment. The method also includes capturing an imposter of a dynamic object by rotating and/or relocating the virtual camera about the isolated segment and recalculating the bounding box and capturing a second sprite of the isolated segment that is specific to a second location and/or a second angle of rotation of the virtual camera relative to the isolated segment. The method also includes capturing an imposter of a dynamic object by from the captured sprite, storing a relative camera rotation in UV coordinates, a relative camera position in the UV coordinates, and bounding box information including a bounds size, a bounds center in the UV coordinates, a depth atlas position, and a color atlas position as texture data for the avatar, where data for multiple sprites is stored as the texture data for the avatar, wherein each cell is a pixel so there are four channels of information (red, green, blue, alpha) so data for each category is written into this 4 channel format. The method also includes capturing an imposter of a dynamic object by rendering the imposter of the dynamic object from the texture data by overlay the quad mesh over the isolated segment, sending material property block data and the texture data for the avatar from a central processing unit (CPU) into a graphics processing unit (GPU), where material property block data include a sprite count, which is a number of sprites stored in the texture data, a data chunk start, which is a position in the texture data where sprites for the isolated segment are present, and for every frame sending an isolated segment current rotation matrix, whereby using material property blocks in this way permits static batching, meaning that each impostor can render in only one draw call, despite having multiple instances of a mesh, selecting a sprite for the isolated segment that matches the location and rotation for a perspective from which the isolated segment is to be rendered, calculating a location of the selected sprite in world space UV coordinates, and offsets of the vertices of the mesh based on the bounds data for that pose and angle, and shading the quad mesh using a fragment shader using the texture data for the selected sprite to yield the rendered imposter.

Aspect 2: In one aspect, a method rendering a simplified version of a dynamic object using sprites recorded as texture data, where the sprites are created from an original version of the dynamic object, the method includes overlaying a quad mesh over at least one isolated segment of a dynamic object, selecting a sprite in the texture data for the at least one isolated segment of the avatar that matches the location and rotation for a perspective from which the isolated segment is to be rendered, where the texture data stores information about a plurality of sprites, respective sprites in the plurality of sprites correspond to an isolated segment in a pose and an angle from which the sprite was captured, rendering a simplified version of the dynamic object from data in the texture data associated with the selected sprite.

Aspect 3: The method of Aspect 2 may also include where the at least one isolated segment of the dynamic object captured from a plurality of orientations and rotations of the virtual camera.

Aspect 4: The method of any one of Aspects 2-3 may also include where the texture data recorded from the sprites includes a relative camera rotation in UV coordinates, a relative camera position in the UV coordinates, and bounding box information.

Aspect 5: The method of any one of Aspects 2-4 may also include where the rendering a simplified version of the dynamic object from the texture data further includes sending material property block data and the texture data for the dynamic object from a central processing unit (CPU) into a graphics processing unit (GPU), where the material property block data includes a sprite count, which is a number of sprites stored in the texture data, a data chunk start.

Aspect 6: The method of any one of Aspects 2-5 may also include where the rendering a simplified version of the dynamic object from the texture data further includes calculating a location of the selected sprite in world space UV coordinates, and offsets of the vertices of the mesh based on the bounds data for that pose and angle, where the bounds data includes offsets that translates the 0-1 values in the texture to get depth and to align the center spot and rotation.

Aspect 7: The method of any one of Aspects 2-6 may also include where the rendering a simplified version of the dynamic object from the texture data further includes shading the quad mesh using a fragment shader using the texture data for the selected sprite to yield the rendered imposter.

Aspect 8: The method of any one of Aspects 2-7 may also include further includes capturing a plurality of sprites from which to render the simplified version of the dynamic object by downloading the dynamic object, where the dynamic object is an avatar, duplicating the dynamic object to yield a duplicated dynamic object, reducing the duplicated dynamic object to parent segments, where when the dynamic object is the avatar the parent segments are bones of a skeleton making up the avatar, isolating at least one parent segment of the parent segments to yield the isolated segment, overlaying the quad mesh on top of the isolated segment, and name the quad mesh, locating the isolated segment at a scene origin, creating a bounding box that envelopes the isolated segment, the bounding box is created by using a convex mesh collider to identify boundaries of the isolated segment and drawing the bounding box to include the boundaries of the isolated segment, scaling a field of view of a virtual camera to approximately match the bounding box, capturing a sprite of the isolated segment by the virtual camera, where the sprite is specific to a location and angle of rotation of the virtual camera with respect to the isolated segment, rotating and/or relocating the virtual camera about the isolated segment and recalculating the bounding box and capturing a second sprite of the isolated segment that is specific to a second location and/or a second angle of rotation of the virtual camera relative to the isolated segment, repeating the scaling, capturing, and rotating until sufficient sprites are captured to represent the isolated segment from likely poses and angles, from the captured sprites, storing a relative camera rotation in UV coordinates, a relative camera position in the UV coordinates, and bounding box information including a bounds size, a bounds center in the UV coordinates, a depth atlas position, and a color atlas position as texture data for the avatar, where data for the sprites is stored as the texture data for the dynamic object.

Aspect 9: The method of any one of Aspects 2-8 may also include wherein the bounding box information includes a bounds size (the dimensions of the bounding box), a bounds center in the UV coordinates (the central point of the bounding box), a depth atlas position (the position of the depth information in the texture atlas), and a color atlas position (the position of the color information in the texture atlas) as texture data for the avatar.

Aspect 10: The method of any one of Aspects 2-9 may also include where the material property block data further includes an isolated segment current rotation matrix, which is provided to the GPU every frame.

Aspect 11: The method of any one of Aspects 2-10 may also include where the isolating the at least one parent segment of the parent segments to yield the isolated segment includes selecting the at least one parent segment of the dynamic object to be isolated from the parent segments, the parent segments are represented by a tree of joints, identify locations of joints at terminal ends of the at least one parent segment to be isolated onto portions of the rendered version of the complex avatar, reparenting the tree of joints to make one of the joints at the terminal ends of the segment a new root node of the tree of joints with other parent segments in the tree of joints being child nodes, scaling the child nodes where the joints at terminal ends of the segment to be isolated are scaled to less than 1% scale, thereby collapsing portions of the tree of joints other than the isolated segment into the respective joints at the terminal ends of the isolated segment resulting in a rendering of the isolated segment. Other technical features may be readily apparent to one skilled in the art from the following figures, descriptions, and claims.

What is claimed is:

1. A method rendering a simplified version of a dynamic object using sprites recorded as texture data, wherein the sprites are created from an original version of the dynamic object, the method comprising:

overlaying a quad mesh over at least one isolated segment of a dynamic object;

selecting a sprite in the texture data for the at least one isolated segment of the dynamic object that matches a location and rotation for a perspective from which the at least one isolated segment is to be rendered, wherein the texture data stores information about a plurality of sprites, respective sprites in the plurality of sprites corresponding to the at least one isolated segment in a pose and at an angle from which the sprite was captured, and wherein the plurality of sprites comprises data representing material properties of the isolated segment including color and deformation information for the isolated segment; and rendering the simplified version of the dynamic object from data in the texture data associated with the selected sprite.

2. The method of claim 1, wherein the at least one isolated segment of the dynamic object captured from a plurality of orientations and rotations of the virtual camera.

3. The method of claim 1, wherein the texture data recorded from the sprites includes a relative camera rotation in UV coordinates, a relative camera position in the UV coordinates, and bounding box information.

4. The method of claim 1, wherein the rendering a simplified version of the dynamic object from the texture data further comprises:

sending data associated with the texture data and the texture data for the dynamic object from a central processing unit (CPU) into a graphics processing unit (GPU), wherein the data associated with the texture data includes a sprite count, which is a number of sprites stored in the texture data, and a data chunk start.

5. The method of claim 4, wherein the data associated with the texture data further includes an isolated segment current rotation matrix, which is provided to the GPU every frame.

6. The method of claim 1, wherein the rendering a simplified version of the dynamic object from the texture data further comprises:

mapping the selected sprite to the quad mesh, and deforming the quad mesh based on the texture data for the selected sprite.

7. The method of claim 1, wherein the rendering a simplified version of the dynamic object from the texture data further comprises:

shading the quad mesh using a fragment shader using the texture data for the selected sprite to yield the rendered imposter.

8. The method of claim 1, further comprising:

capturing a plurality of sprites from which to render the simplified version of the dynamic object by:

downloading the dynamic object;

duplicating the dynamic object to yield a duplicated dynamic object;

reducing the duplicated dynamic object to parent segments;

isolating at least one parent segment of the parent segments to yield the isolated segment;

overlaying the quad mesh on top of the isolated segment;

locating the isolated segment at a scene origin;

creating a bounding box that envelopes the isolated segment;

scaling a field of view of a virtual camera to approximately match the bounding box;

capturing a sprite of the isolated segment by the virtual camera, wherein the sprite is specific to a location and angle of rotation of the virtual camera with respect to the isolated segment;

rotating and/or relocating the virtual camera about the isolated segment and recalculating the bounding box and capturing a second sprite of the isolated segment that is specific to a second location and/or a second angle of rotation of the virtual camera relative to the isolated segment;

repeating the scaling, capturing, and rotating until sufficient sprites are captured to represent the isolated segment from likely poses and angles;

from the captured sprites, storing a relative camera rotation in UV coordinates, a relative camera position in the UV coordinates, and bounding box information including a bounds size, a bounds center in the UV coordinates, a depth atlas position, and a color atlas position as texture data for the dynamic object, wherein data for the sprites is stored as the texture data for the dynamic object.

9. A computing system comprising:

a processor; and a memory storing instructions that, when executed by the processor, configure the computing system to:

overlay a quad mesh over at least one isolated segment of a dynamic object;

select a sprite in the texture data for the at least one isolated segment of the dynamic object that matches a location and rotation for a perspective from which the at least one isolated segment is to be rendered, wherein the texture data stores information about a plurality of sprites, respective sprites in the plurality of sprites corresponding to the at least one isolated segment in a pose and at an angle from which the sprite was captured, and wherein the plurality of sprites comprises data representing material properties of the isolated segment including color and deformation information for the isolated segment; and render the simplified version of the dynamic object from data in the texture data associated with the selected sprite.

10. The computing system of claim 9, wherein the at least one isolated segment of the dynamic object captured from a plurality of orientations and rotations of the virtual camera.

11. The computing system of claim 9, wherein the texture data recorded from the sprites includes a relative camera rotation in UV coordinates, a relative camera position in the UV coordinates, and bounding box information.

12. The computing system of claim 9, wherein the rendering a simplified version of the dynamic object from the texture data further comprises:

send data associated with the texture data and the texture data for the dynamic object from a central processing unit (CPU) into a graphics processing unit (GPU), wherein the data associated with the texture data includes a sprite count, which is a number of sprites stored in the texture data, and a data chunk start.

13. The computing system of claim 12, wherein the data associated with the texture data further includes an isolated segment current rotation matrix, which is provided to the GPU every frame.

14. The computing system of claim 9, wherein the rendering a simplified version of the dynamic object from the texture data further comprises:

map the selected sprite to the quad mesh, and deform the quad mesh based on the texture data for the selected sprite.

15. The computing system of claim 9, wherein the rendering a simplified version of the dynamic object from the texture data further comprises:

shade the quad mesh using a fragment shader using the texture data for the selected sprite to yield the rendered imposter.

16. A non-transitory computer-readable storage medium, the computer-readable storage medium including instructions that when executed by at least one processor, cause the at least one processor to:

overlay a quad mesh over at least one isolated segment of a dynamic object;

select a sprite in the texture data for the at least one isolated segment of the dynamic object that matches a location and rotation for a perspective from which the at least one isolated segment is to be rendered, wherein the texture data stores information about a plurality of sprites, respective sprites in the plurality of sprites corresponding to an isolated segment in a pose and at an angle from which the sprite was captured, and wherein the plurality of sprites comprises data representing material properties of the isolated segment including color and deformation information for the isolated segment; and render the simplified version of the dynamic object from data in the texture data associated with the selected sprite.

17. The computer-readable storage medium of claim 16, wherein the rendering a simplified version of the dynamic object from the texture data further comprises:

send data associated with the texture data and the texture data for the dynamic object from a central processing unit (CPU) into a graphics processing unit (GPU), wherein the data associated with the texture data includes a sprite count, which is a number of sprites stored in the texture data, and a data chunk start.

18. The computer-readable storage medium of claim 17, wherein the data associated with the texture data further includes an isolated segment current rotation matrix, which is provided to the GPU every frame.

19. The computer-readable storage medium of claim 16, wherein the rendering a simplified version of the dynamic object from the texture data further comprises:

map the selected sprite to the quad mesh, and deform the quad mesh based on the texture data for the selected sprite.

20. The computer-readable storage medium of claim 16, wherein the rendering a simplified version of the dynamic object from the texture data further comprises:

shade the quad mesh using a fragment shader using the texture data for the selected sprite to yield the rendered imposter.

* * * * *